US012770450B2

(12) United States Patent
Huber et al.

(10) Patent No.: US 12,770,450 B2
(45) Date of Patent: Oct. 20, 2026

(54) SENSOR ELEMENT, TEST DEVICE, AND METHOD FOR TESTING DATA CARRIERS HAVING A SPIN RESONANCE FEATURE

(71) Applicant: GIESECKE+DEVRIENT CURRENCY TECHNOLOGY GMBH, Munich (DE)

(72) Inventors: Stephan Huber, Munich (DE); Sina Scholz-Riecke, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 150 days.

(21) Appl. No.: 18/862,691

(22) PCT Filed: May 5, 2023

(86) PCT No.: PCT/EP2023/025207
§ 371 (c)(1),
(2) Date: Nov. 4, 2024

(87) PCT Pub. No.: WO2023/213436
PCT Pub. Date: Nov. 9, 2023

(65) Prior Publication Data
US 2025/0285486 A1 Sep. 11, 2025

(30) Foreign Application Priority Data
May 6, 2022 (DE) ..................... 10 2022 001 594.3

(51) Int. Cl.
*G07D 7/04* (2016.01)
*G01N 24/10* (2006.01)

(52) U.S. Cl.
CPC ............... *G07D 7/04* (2013.01); *G01N 24/10* (2013.01); *G07D 2207/00* (2013.01)

(58) Field of Classification Search
None
See application file for complete search history.

(56) References Cited

U.S. PATENT DOCUMENTS 3,638,104 A 1/1972 Wright
5,149,946 A 9/1992 Jerome et al.
(Continued)

FOREIGN PATENT DOCUMENTS

DE 3408086 A1 9/1985
EP 1646057 A2 4/2006

OTHER PUBLICATIONS

Enomoto, Ayano et al., "Four-Channel Surface Coil Array for 300-MHz Pulsed EPR Imaging: Proof-of-Concept Experiments", Magnetic Resonance in Medicine, vol. 71, Issue 2, as early as Feb. 1, 2014, pp. 853-858.
(Continued)

*Primary Examiner* — Rodney E Fuller
(74) *Attorney, Agent, or Firm* — Workman Nydegger

(57) ABSTRACT

A sensor element for testing a flat-surface data carrier having a spin resonance feature. The sensor element includes a magnetic core with an air gap, into which the flat-surface data carrier can be inserted for testing, a polarization device for generating a static magnetic flux in the air gap, a resonator device for exciting the spin resonance feature of the data carrier to be tested in the air gap, having at least one stripline resonator fed by a signal source, and a modulation device for generating a time-varying magnetic modulation field in the air gap parallel to the static magnetic field. The modulation device has a plurality of modulation coils, which are designed and configured for generating different modulation frequencies so that the modulated magnetic field generated by the modulation device, together with the polar-
(Continued)

ization device, has different modulation frequencies at different locations within the air gap.

19 Claims, 2 Drawing Sheets

(56) References Cited

U.S. PATENT DOCUMENTS

| | | | | |
|---|---|---|---|---|
| 5,302,898 | A | 4/1994 | Pethig et al. | |
| 12,626,557 | B2 * | 5/2026 | Huber | G07D 7/04 |
| 2004/0251904 | A1 | 12/2004 | Corver et al. | |
| 2025/0291010 | A1 * | 9/2025 | Huber | G01R 33/3456 |
| 2025/0356715 | A1 * | 11/2025 | Huber | G07D 7/04 |

OTHER PUBLICATIONS

German Search Report from corresponding German Patent Application No. DE102022001594.3, Nov. 2, 2022.

International Search Report from corresponding PCT Application No. PCT/EP2023/025207, Aug. 17, 2023.

* cited by examiner

SENSOR ELEMENT, TEST DEVICE, AND METHOD FOR TESTING DATA CARRIERS HAVING A SPIN RESONANCE FEATURE

BACKGROUND

The invention relates to a sensor element for checking the authenticity of a flat-surface data carrier, in particular a banknote, having a spin resonance feature. The invention also relates to a test device having such a sensor element and to a method for testing authenticity using such a sensor element or such a test device.

Data carriers, such as value or identification documents, but also other valuable objects, such as brand-name articles, are often provided with security elements that allow the data carriers to be authenticated and that also serve as protection against unauthorized reproduction. It is well known in the field of machine authentication to use security elements with spin resonance features to secure documents and other data carriers. The security elements are provided with substances that have a spin resonance signature. The spin resonance signatures that can be used for authenticity testing include, in particular, nuclear magnetic resonance (NMR) effects, electron spin resonance (ESR) effects, and ferromagnetic resonance (FMR) effects.

In the process of checking banknotes, three different magnetic fields are usually generated in the measuring range of a banknote processing machine, for example, to detect the spin resonance signatures. This is specifically a quasi-static polarization field $B_0$, which runs parallel to the axial direction (z direction) of the air gap of a magnetic circuit. A second magnetic field is formed by a modulation field $B_{mod}$, which also runs parallel to the z-axis and typically has a frequency f mod in the kHz range. For excitation of transitions between the split spin energy levels of the spin resonance signature substances, an excitation field $B_1$ is provided, which is polarized perpendicular to the $B_0$ direction. The excitation field oscillates at the resonance frequency of the material, which is also referred to as the Larmor frequency, and which is proportional to the polarization field $B_0$.

To generate the polarization field $B_0$, a magnetic circuit is often used that directs the magnetic flux of permanent magnets and/or coils to an air gap in which the testing of the flat-surface data carriers takes place.

A high-frequency resonator, for example a stripline resonator, is used for generating the excitation field $B_1$. A detector diode is used to measure the RF power reflected by the resonator. If a test specimen is in resonance at a coupled-in frequency, the resonator quality changes, and with it the power reflected by the resonator. Due to the field modulation $B_{mod}$, the exact value of the Larmor frequency of the test specimen oscillates, and the measurement signal is amplitude modulated with $f_{mod}$. The spectral power distribution at the input of the detector diode then shows, in addition to the central microwave carrier frequency, modulation peaks offset by $\pm f_{mod}$, which carry the desired spin resonance information.

When checking the authenticity of a data carrier, there is often a need to be able to operate multiple independent resonators with the same frequency, for example, in order to be able to detect the spin resonance information in a spatially resolved manner. Conventionally, each resonator requires an independent microwave circuit for the detection and evaluation of the measurement signal. These microwave circuits are typically realized on circuit boards by means of SMD components and striplines. A large amount of installation space is required for multiple independent circuits. If this installation space is not available, the various circuits can quickly be affected by crosstalk causing signal distortion to occur.

In addition, the functionality of many elements in a microwave circuit is defined by the geometry of the elements involved. Especially at high frequencies, i.e. short wavelengths, the manufacturing tolerance has a strong effect on the functionality of the circuit. For example, if multiple identical microwave circuits are to be set up in parallel, for example for the above-mentioned spatially resolved measurement of spin resonances, the nominally identical microwave circuits can differ considerably in their functionality in practice and make reliable spatially resolved measurement more difficult.

SUMMARY

Against this background, the object of the invention is to avoid the disadvantages of the prior art and in particular to provide a sensor element of the type mentioned above, which allows improved detection of the spin resonance feature of a flat-surface data carrier.

This object is achieved by means of the features of the independent claims. Developments of the invention are the subject of the dependent claims.

The invention provides a sensor element for testing, in particular testing the authenticity, of a flat-surface data carrier having a spin resonance feature. The flat-surface data carrier can be formed by a banknote, for example. The sensor element contains a magnetic core with an air gap, into which the flat-surface data carrier can be inserted for testing, a polarization device for generating a static magnetic flux in the air gap, and a resonator device for exciting the spin resonance feature of the data carrier to be tested in the air gap, having at least one stripline resonator fed by a signal source. The spin resonance feature is preferably an ESR feature.

The sensor element also contains a modulation device for generating a time-varying magnetic modulation field in the air gap parallel to the static magnetic field. The modulation device comprises a plurality of modulation coils, which are designed and configured for generating different modulation frequencies, so that the modulated magnetic field generated by the modulation device together with the polarization device has different modulation frequencies at different locations within the air gap.

In principle, stripline resonators are characterized in particular in that their sensitive region is very easily accessible and that they have a very high filling factor for flat samples, such as those formed by the banknotes to be tested. The stripline resonators are sometimes referred to below as resonators purely for brevity.

The resonator device is also designed in particular for detecting spin resonance signals of the spin resonance feature. The resonator device can in particular record a response signal of the spin resonance feature and output it to a detector. The spin resonances can be determined, for example, with a continuous wave (CW) method, a pulsed method, or a rapid scan method.

In an advantageous embodiment, it is provided that the modulation coils of the modulation device are arranged offset next to one another. Each modulation coil then generates a spatial region of the modulation field with its respective modulation frequency.

Advantageously, at least one or preferably even all modulation coils of the modulation device is/are formed by planar coils, which have one or more turns around an axial direction of the air gap in a plane. The said plane with the one or more turns is advantageously perpendicular to the axial direction (z direction) of the air gap, i.e. the direction between the pole surfaces of the magnetic core adjacent to the air gap. Thus, the modulation field is advantageously aligned parallel to the polarization field.

The modulation coils are advantageously all arranged in the same plane on a common coil carrier, in particular a common printed circuit board.

In an advantageous embodiment of the invention, the modulation coils are designed and configured for generating modulation frequencies which are not in a simple integer ratio to each other, in particular not in a ratio of 1:n, with n a natural number less than 6. In other words, the generated modulation frequencies of each two modulation coils are not in a simple ratio of 1:2, 1:3, 1:4, 1:5, or a reciprocal ratio thereto.

The modulation coils are preferably designed and configured for generating modulation frequencies which differ by more than their line width and by more than the line width of the high-frequency signal of the resonators. For example, the modulation frequencies of the plurality of modulation coils differ by more than 5% in each case, preferably by more than 20%.

In an advantageous embodiment, the modulation coils of the modulation device are arranged in the form of a one-dimensional, in particular linear, array. The one-dimensional array extends in particular transversely to a transport direction of the data carrier to be tested and enables a two-dimensional scan of a data carrier being moved in the transport direction.

An arrangement of multiple modulation coils one after another in the transport direction is also possible, in particular in combination with a spatially inhomogeneous polarization field, and can be used to generate a spectral resolution. In a further advantageous embodiment, the modulation coils of the modulation device are arranged in the form of a two-dimensional array, for example on the grid points of a regular grid, for example in a rectangular, hexagonal or line-by-line offset arrangement, and enable a two-dimensional spatial resolution even on a stationary data carrier.

The arrangement of the modulation coils extends advantageously over the entire width of the data carrier to be tested, in particular a banknote, in order to enable a test for completeness.

According to an advantageous embodiment, the resonator device has a plurality of stripline resonators, and in particular it is preferably provided that the number of stripline resonators in the resonator device is equal to the number of modulation coils in the modulation device, or that the number of stripline resonators in the resonator device is an integer multiple of the number of modulation coils in the modulation device.

The stripline resonators of the resonator device advantageously have the same resonance frequency, for example with a frequency deviation of less than 1%, preferably of less than 0.1%. Preferably, the stripline resonators of the resonator device are even designed and configured for operation in the same spatial mode. Alternatively or additionally, it is also advantageously provided that the stripline resonators of the resonator device have the same geometric shape, for example a square, rectangular or annular shape. The stripline resonators are preferably designed and configured for operation at the same excitation frequency, for example with a frequency deviation of less than 1%, preferably of less than 0.1%.

The stripline resonators of the resonator device are preferably arranged in the same plane, advantageously on a common resonator carrier, in particular a common printed circuit board. This plane is conveniently perpendicular to the direction of the static magnetic flux. Since the flat stripline resonators generate a $B_1$ field with field components primarily in the plane of the resonators, the generated field is then perpendicular to the polarization field $B_0$, as required for the spin resonance excitation.

In an advantageous variant of the invention, the polarization device generates substantially the same static magnetic flux at the location of each of the stripline resonators. The maxi-mum deviation of the static magnetic flux at the location of different stripline resonators is advantageously less than 2%.

In another, also advantageous variant of the invention, the polarization device generates a spatially inhomogeneous static magnetic flux in the air gap, for example in order to achieve a spectral resolution in the measurement.

In advantageous embodiments, multiple stripline resonators, in particular the same number in each case, are located in the region of the modulation field of each modulation coil. In the case of similar, jointly interconnected stripline resonators, this allows an improvement in the signal-to-noise ratio. In particular, each modulation coil can be assigned an N×M array of stripline resonators, where N and M are natural numbers and at least one of the values of N and M is greater than 1, wherein the stripline resonators of the N×M array are all fed from the same signal source and are electrically connected in parallel and/or in series.

In a further advantageous embodiment, multiple stripline resonators with different resonance frequencies, in particular the same number in each case, are located in the region of the modulation field of each modulation coil. In particular, the stripline resonators are excited with different excitation frequencies that match the resonance frequency in each case. In addition to the spatial resolution, a spectral resolution can thus be achieved.

In another likewise advantageous embodiment, the sensor element contains only one or a small number of stripline resonators with extended field distribution, each covering the region of multiple modulation coils. The extended field distribution advantageously contains multiple localized field maxima, for example due to the operation of the single resonators in a higher spatial mode.

In advantageous embodiments, it is provided that the modulated magnetic field in the measuring range of each stripline resonator in has substantially only one single modulation frequency $f_{Mod,\ i}$. However, the same modulation frequency $f_{Mod,i}$ can exist in the measuring range of several stripline resonators $i_1, \ldots, i_\mu, \ldots, i_n$ with $n \geq 1$. In addition, further stripline resonators $j_1, \ldots, j_n$ are provided, in the measuring range of which the modulated magnetic field has a different modulation frequency $f_{Mod,j}$. The crosstalk of this modulation field $B_{Mod,j}$ with the observed, for example adjacent, stripline resonator $i_\mu$ is described by a contamination factor $$\chi_{i_\mu j} = \frac{\int B_{Mod,j} dV_{i_u}}{\int B_{Mod,i} dV_{i_u}}$$

wherein the integrals extend over the volume $V_{i\mu}$, which covers the sensitive region of the resonator $i_\mu$. The sum $S_{i\mu}$ of the contamination factors at the location of the resonator in then describes the contribution of all modulation field components of other frequencies:

$$S_{i_u} = \sum_{j \neq i} \chi_{i_\mu j}$$

This sum $S_{i\mu}$ is advantageously less than 2%, in particular less than 0.5% for all stripline resonators $i_\mu$. This allows for a clean separation of the resonators based on their respectively assigned modulation frequencies.

The air gap advantageously has a height, i.e. a dimension in the z-direction, of less than 10 mm, preferably of less than 5 mm.

This allows a particularly strong polarization field, i.e. a strong static magnetic flux, to be generated in the air gap.

The invention also includes a test device for testing a flat-surface data carrier, in particular a banknote, having a spin resonance feature having a sensor element of the type described above and exactly one signal source from which all the stripline resonators of the resonator device are fed.

Advantageously, the test device also includes a transport device which inserts the flat-surface data carriers to be tested along a transport path into the air gap of the magnetic core or passes them through the air gap of the magnetic core, wherein the modulation coils of the modulation device are arranged in the form of a one-dimensional array which extends transversely to the direction of the transport path. The transport device is preferably configured for high-speed transport, for example between 1 m/s and 12 m/s, of the flat-surface data carriers.

The invention also includes a method for testing a flat-surface data carrier, in particular a banknote, having a spin resonance feature by means of a sensor element of the described type or a test device of the described type, wherein in the method

- a flat-surface data carrier to be tested is inserted into the air gap of the magnetic core of the aforementioned sensor element,
- the polarization device is used to generate a static magnetic flux in the air gap and the modulation device is used to generate a time-varying magnetic modulation field in the air gap, so that the modulated magnetic field generated by the modulation device together with the polarization device has different modulation frequencies at different locations within the air gap, and
- the resonator is used to excite the spin resonance feature of the data carrier to be tested.

Advantageously, a response signal of the spin resonance feature generated by the excitation is also recorded with the resonator device and output to a detector. The excitation of the spin resonance feature and/or the recording of the response signal of the spin resonance feature can be carried out in a continuous wave (CW) method, in a pulsed method, or in a rapid scan method.

BRIEF DESCRIPTION OF THE DRAWINGS

Further exemplary embodiments as well as advantages of the invention are explained below by reference to the figures, in the representation of which a true-to-scale and proportional reproduction has been omitted in order to increase the clarity.

In the drawing.

DETAILED DESCRIPTION OF VARIOUS EMBODIMENTS

Figure 1:
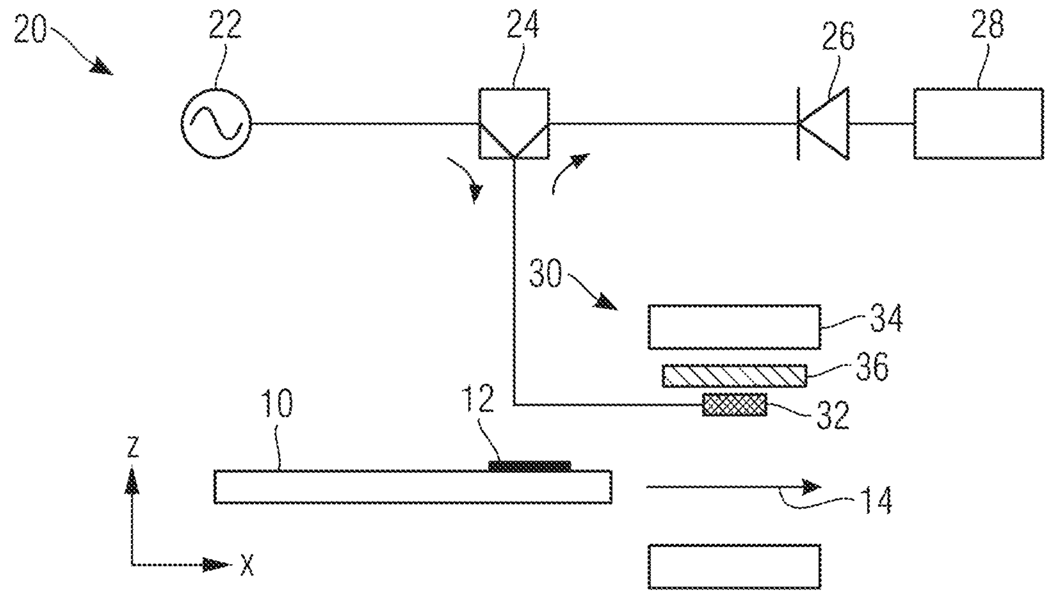
FIG. 1 schematically shows a test device of a banknote processing system for the measurement of spin resonances of a banknote test specimen, FIG. 2 schematically shows the design of the resonator device and the modulation device of a sensor element according to the invention in a first exemplary embodiment.

The invention will now be explained using the example of the authenticity testing of banknotes. FIG. 1 schematically shows a test device 20 of a banknote processing system for the measurement of spin resonances of a banknote test specimen 10.

The banknote test specimen 10 contains a spin resonance feature 12 to be tested, the characteristic properties of which are used to prove the authenticity of the banknote. For the authenticity test, the banknote test specimen 10 is guided along a transport path 14 through a sensor element 30 according to the invention of the test device 20. For the detection of spin resonance signatures of the spin resonance feature 12, the sensor element 30 generates three different magnetic fields in the measuring range.

Firstly, a static magnetic flux is generated parallel to the z-axis in the measuring range by a polarization device 34. Secondly, a modulation device 36 generates a time-varying magnetic modulation field in the air gap, which also runs parallel to the z-axis and has modulation frequencies $f_{Mod}$ in the range between 1 kHz to 1 MHz. While conventional modulation devices usually generate only a single modulation frequency, the modulation device 36 according to the invention contains multiple modulation coils in the manner described in more detail below, which are designed and configured for generating different modulation frequencies.

Finally, a resonator device 32 generates an excitation field, which induces the energy transitions between the spin energy levels in the spin resonance feature 12. The excitation field typically has frequencies above 1 GHz and is polarized perpendicular to the z direction.

The frequency of the excitation field is tuned to the Larmor frequency of the spin resonance feature 12 to be detected, in order to measure its spin resonance signature and to allow it to be used for the authenticity test. For this purpose, the test device 20 contains a signal source 22, the excitation frequency few of which corresponds to the expected Larmor frequency of the spin resonance feature 12. The excitation signal of the signal source 22 is supplied via a duplexer 24 to the resonator device 32, where it generates a magnetic alternating field with frequency $f_{MW}$.

In the present invention, the resonator device 32 comprises one or more stripline resonators for generating the excitation field in the manner described in more detail below. A stripline resonator is a conductive structure with a characteristic length 1, which is applied to a substrate, such as a printed circuit board or a piece of ceramic. If the wavelength λ of the coupled-in high-frequency signal on the printed circuit board matches the dimensioning of the conductor structure, a stationary wave can form, and the resonator is then in resonance at the frequency associated with λ. In particular, stripline resonators are characterized in that their sensitive region is very easily accessible and that they have a very high filling factor for flat samples, such as those formed by the banknotes to be tested.

In addition to the said elements, the test device 20 includes a detector diode 26 for measuring the high-frequency power reflected by the resonator device 32 and an evaluation unit 28 for evaluating and optionally displaying the measurement result. If the spin resonance feature 12 is in resonance at a coupled-in frequency $f_{MW}$, the resonator quality changes, and with it the power reflected by the stripline resonators. Due to the modulation of the static polarization field by the modulation device 36, the exact value of the Larmor frequency of the sample oscillates, so that the obtained measurement signal is amplitude-modulated with the modulation frequency.

Figure 2:
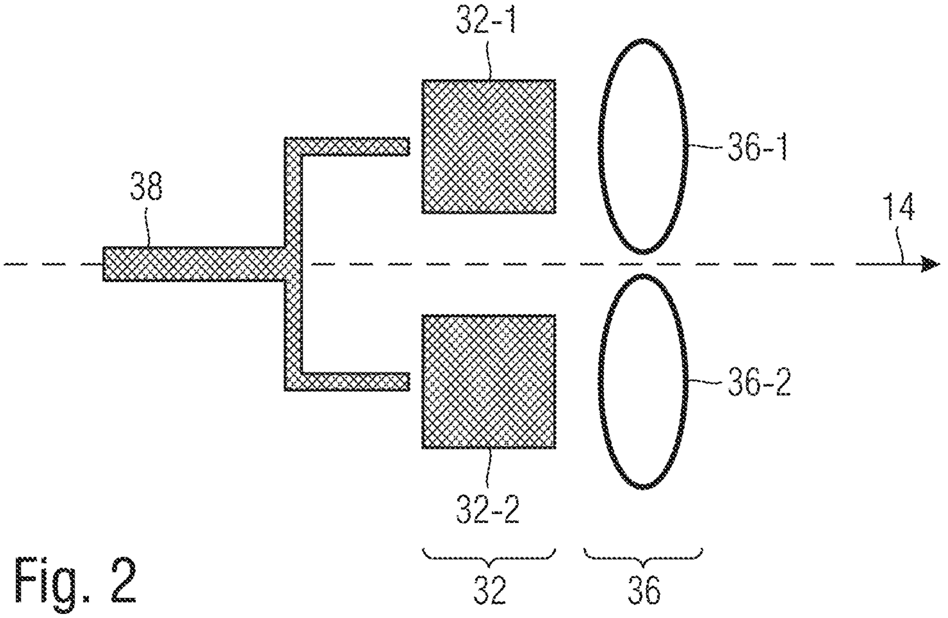

FIG. 2 schematically shows the design of the resonator device 32 and the modulation device 36 of a sensor element 30 according to the invention according to a first exemplary embodiment of the invention. In this exemplary embodiment, the sensor element 30 contains a resonator device 32 consisting of an array of jointly connected stripline resonators 32-1, 32-2 in combination with a modulation device 36 consisting of an array of modulation coils 36-1, 36-2.

In the figure, to illustrate the basic principle, an embodiment with only two resonators 32-1, 32-2 and only two modulation coils 36-1, 36-2 is shown, but it is understood that a larger number of resonators 32-*j*, with j=1, . . . , m, and of modulation coils 36-*i*, with i=1, . . . , n, with natural numbers n and m (m=number of stripline resonators, n=number of modulation coils) can be provided. While in the design of FIG. 2 the case n=m=2 is shown, in general m≥1 and n≥2 applies, where n can be equal to m, but also unequal to m.

Figure 3:
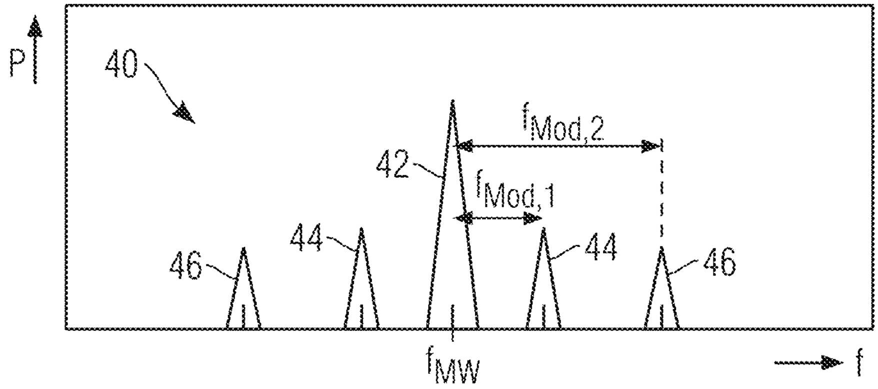
FIG. 3 shows the spectral power distribution of the RF signal reflected from the sensor element according to FIG. 2 for different modulation frequencies, and FIG. 4 schematically shows the circuit wiring used in the described simulation of a sensor element with an array of two modulation coils and two square λ/2 stripline resonators.

The modulation coils 36-*i* of the modulation-coil array 36 in the exemplary embodiment generate for each resonator of the resonator device 32 a local modulation field with its own modulation frequency $f_{Mod,i}$. This results in specific modulation peaks 44 and 46 in the spectral power distribution 40 of the reflected microwave signal for each resonator 32-*j*, as illustrated in FIG. 3. These modulation peaks 44, 46 can be separated from each other digitally, i.e. in a space-saving manner, by frequency in the lock-in method.

Specifically, in the exemplary embodiment of FIGS. 2 and 3, due to the common circuit wiring 38 the resonators 32-1, 32-2 receive an excitation signal of the same frequency $f_{MW}$ from the signal source 22. In the modulation device 36, the first modulation coil 36-1 generates a modulation field with the frequency $f_{Mod,1}$, and the modulation coil 36-2 generates a modulation field with a different frequency $f_{Mod,2} \neq f_{Mod,1}$.

The two modulation frequencies are chosen in such a way that they are not in a simple integer ratio and their difference is chosen so large that the modulation frequencies $f_{Mod,1}$, $f_{Mod,2}$ differ by more than their line width and by more than the line width of the high-frequency signal of the resonators 32-1, 32-2. In particular, the modulation frequencies even differ by more than twice the largest of the given line widths.

With reference to the power spectrum 40 of the reflected high-frequency signal shown in FIG. 3, the carrier frequency $f_{MW}$ (reference sign 42) is flanked by first modulation peaks 44, which are offset by $\pm f_{Mod,1}$ relative to the carrier frequency 42, and is flanked by two modulation peaks 46, which are offset by $\pm f_{Mod,2}$ relative to the carrier frequency 42. The modulation peaks 44, 46 can be easily separated from each other by frequency using the lock-in method.

Within the scope of the invention, resonator devices 32 and modulation devices 36 with a fairly large number of stripline resonators or modulation coils are possible, as long as it is ensured that the various frequency components in the power spectrum can still be cleanly separated.

The exemplary embodiment of FIG. 2 shows an advantageous embodiment, in which the number m of the resonators 32-*j* is equal to the number n of the modulation coils 36-*i* and in which the resonators 32-*j* and modulation coils 36-*i* are assigned to each other in pairs. The modulation coils 36-*i* are arranged in this exemplary embodiment in the form of a one-dimensional array 36, which extends transversely to the transport direction 14 of the banknote 10. In conjunction with the movement of the banknote test specimen, a two-dimensional scan of the transported banknote test specimen 10 is thereby enabled.

In addition to the parallel connection shown in FIG. 2, a series connection or a combination of series and parallel connection are also possible for the resonators 32-*i*. In another embodiment, a single resonator with extended field distribution, in particular with multiple localized field maxima, can cover the range of multiple modulation coils by operating in a higher spatial mode.

For the correct functionality of the modulation coil array, it is advantageous if the modulation coils "cross-modulate", i.e. contaminate the modulation channels of the adjacent modulation coils, as little as possible. Such contamination can occur when, for example, the modulation coil 36-1 of FIG. 2 generates a modulation field $B_{Mod,1}$, which still has a substantial amplitude in the sensitive region of the resonator 32-2, or conversely, the modulation coil 36-2 generates a modulation field $B_{Mod,2}$ which still has a substantial amplitude in the sensitive region of the resonator 32-1.

If there is an equal number k=n=m of resonators and modulation coils, a contamination factor $\chi_{ij}$ can be defined by $$\chi_{ij} = \frac{\int B_{Mod,j} dV_i}{\int B_{Mod,i} dV_i}$$

with $j = 1, \ldots, k$, and $i = 1, \ldots, k$.

The contamination factor $\chi_{ij}$ indicates the size of the parasitic signal components of other modulation frequencies, which are generated by a cross-modulation in the resonator 32-*i*. The volume $V_i$ to be used for the integration describes the sensitive region of the resonator 32-*i*.

For i=j, the variables $\chi_{ii}$ are also formally defined and by design equal to 1, but they do not describe contamination, rather the desired signal generated by the modulation coil 36-*i* in the associated resonator 32-*i*, and are therefore disregarded in the summing operation.

For the functionality of the modulation coil array 36 it is now advantageous that for each modulation channel 36-*i* the sum over all contamination factors, that is $$\sum_{j}^{j \neq i} \chi_{ij}$$

is less than 2%. The sum for each modulation channel is particularly advantageously even less than 0.5%.

An analogous definition of the contamination factors and the sum of the contamination factors can be used if the number m of resonators is not equal to the number n of modulation coils.

In order to demonstrate the superior performance of sensor elements according to the invention, the behavior of a sensor element according to FIG. 2 was simulated with an array of two modulation coils 36-1, 36-2 and two square λ/2 stripline resonators 32-1, 32-2.

Figure 4:
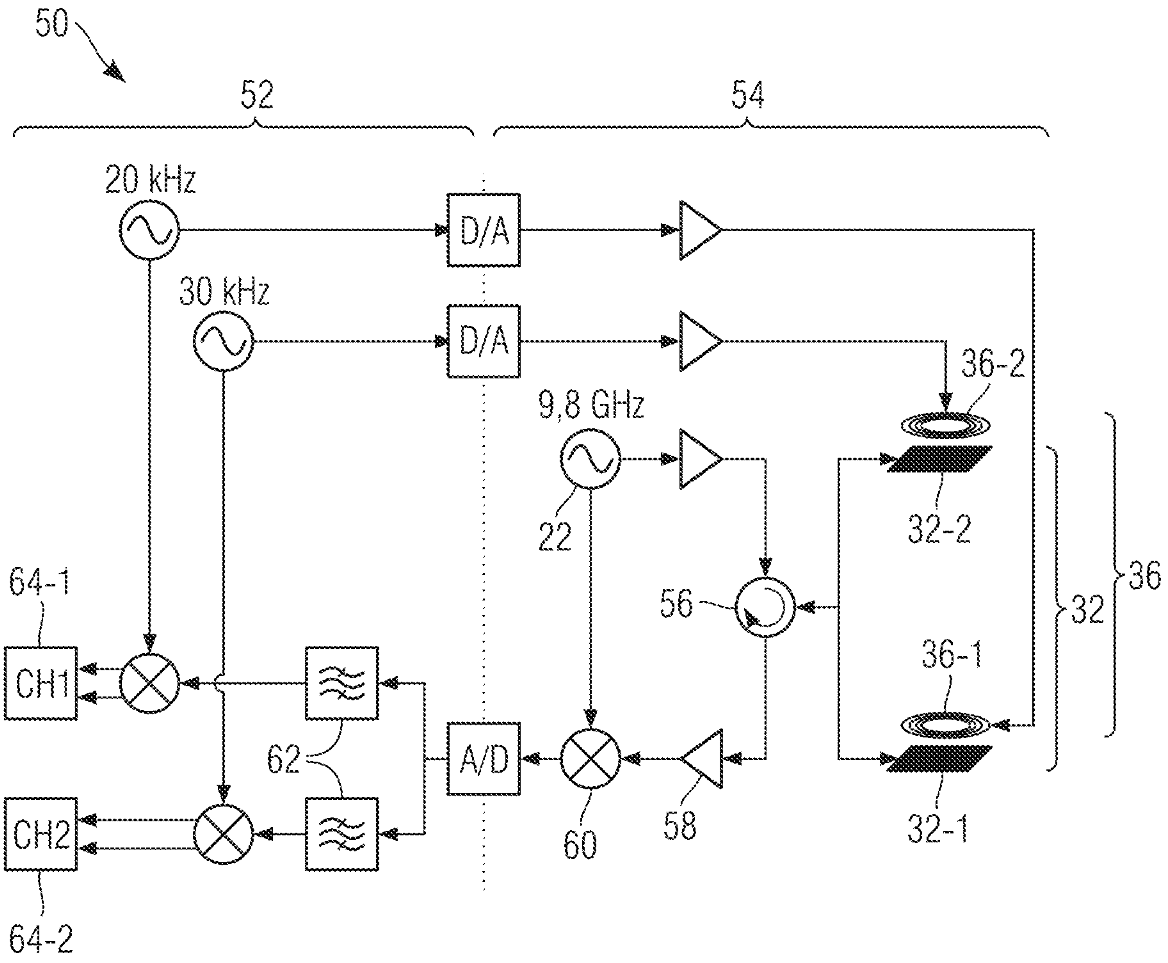

The circuit 50 underlying the simulation is shown schematically in FIG. 4. It contains a digital part 52 and an analog part 54.

The two λ/2 stripline resonators 32-1, 32-2 are mounted on a printed circuit board with a thickness of 1.5 mm, the dielectric constant of which is 3.66. The resonators 32-1, 32-2 are a distance of 15 mm apart, the edge length of the resonators is 7.1 mm in each case, corresponding to a resonance frequency of 9.8 GHz.

The impedance of each resonator 32-1, 32-2 is transformed up to 100Ω by means of a 24 impedance transformer. A total impedance of 50Ω is obtained by connecting the two basic elements in parallel. The resonator array 32 formed from the two resonators is fed via a circulator 56 from the amplified output signal of a signal source 22. The signal source 22 is operated at 9.8 GHz in continuous wave (CW) mode.

A planar modulation coil 36-1 or 36-2 is positioned opposite each resonator 32-1 and 32-2 at a distance of 2 mm. The modulation coils 36-1, 36-2 are spiral-shaped, have 15 turns and a diameter of 5 mm. The modulation coil 36-1 of the first resonator 32-1 is operated with a frequency $f_{Mod,1}$=20 kHz, the modulation coil 36-2 of the second resonator 32-2 with a frequency $f_{Mod,2}$=30 kHz. The respective modulation signals are digitally generated in an FPGA, then subjected to a D/A conversion and amplified such that the same current flows through both modulation coils 36-1, 36-2.

The resonator array 32 and the modulation coil array 36 were placed in the air gap of a magnetic circuit and loaded with a paper sample provided with a spin resonance feature. The Larmor frequency of the spin resonance feature with the present polarization field corresponds exactly to the 9.8 GHz excitation frequency.

In the next step, the signal reflected from the resonator array 32 was amplified with a low-noise receiver amplifier 58 and downmixed with the 9.8 GHz excitation signal (reference sign 60). The phase shifter and the filter banks are not shown in FIG. 4 for the sake of clarity. After downmixing, the signal is digitized and fed to the FPGA.

In the FPGA, the signal is split into two channels. Both channels are bandpass-filtered (reference sign 62), with the first channel having a center frequency of 20 kHz and the second channel having a center frequency of 30 kHz. Both filters have a bandwidth of 5 kHz. The first channel is then demodulated with the 20 kHz modulation signal, the second channel with the 30 kHz modulation signal, and the demodulated output signals are fed to an evaluation unit 64-1 for channel 1 and an evaluation unit 64-2 for channel 2. The demodulation involves a quadrature-amplitude modulation. The phase shifters used are again not shown in the figure. The associated filter banks, which are also not shown in the figure, have a bandwidth of 2.5 kHz.

Finally, the polarization field of the magnetic circuit was traversed with a field sweep and the output signals of the two channels were recorded by the evaluation units 64-1, 64-2. Both channels show the spectrum of the spin resonance feature used for the doping and correspond to different measuring points on the banknote.

List of reference signs

| | |
|---|---|
| 10 | banknote test specimen |
| 12 | spin resonance feature |
| 14 | transport path |
| 20 | test device |
| 22 | signal source |
| 24 | duplexer |
| 26 | detector diode |
| 28 | evaluation unit |
| 30 | sensor element |
| 32 | resonator device |
| 32-1, 32-2, 32-j | resonators |
| 34 | polarization device |
| 36 | modulation device |
| 36-1, 36-2, 36-i | modulation coils |
| 40 | spectral power distribution |
| 42 | carrier frequency |
| 44, 46 | modulation peaks |
| 50 | circuit |
| 52 | digital circuit part |
| 54 | analog circuit part |
| 56 | circulator |
| 58 | reception amplifier |
| 60 | downward mixing |
| 62 | bandpass filtering |
| 64-1, 64-2 | evaluation units |

The invention claimed is:

1. A sensor element for checking a flat-surface data carrier having a spin resonance feature, with a magnetic core with an air gap, into which the flat-surface data carrier can be inserted for testing, a polarization device for generating a static magnetic flux in the air gap, a resonator device for exciting the spin resonance feature of the data carrier to be tested in the air gap, having at least one stripline resonator fed by a signal source, and a modulation device for generating a time-varying magnetic modulation field in the air gap parallel to the static magnetic field, wherein the modulation device comprises a plurality of modulation coils, which are designed and configured for generating different modulation frequencies, so that the modulated magnetic field generated by the modulation device together with the polarization device has different modulation frequencies at different locations within the air gap.

2. The sensor element according to claim 1, wherein the modulation coils of the modulation device are arranged offset next to one another.

3. The sensor element according to claim 1, wherein at least one modulation coils of the modulation device are formed by planar coils, which have one or more turns around an axial direction of the air gap in a plane.

4. The sensor element according to claim 1, wherein the modulation coils are arranged in the same plane on a common coil carrier.

5. The sensor element according to claim 1, wherein the modulation coils are designed and configured for generating modulation frequencies which are not in a simple integer ratio to each other.

6. The sensor element according to claim 1, wherein the modulation coils are designed and configured for generating modulation frequencies which differ by more than their line width and by more than the line width of the high-frequency signal of the resonators.

7. The sensor element according to claim 1, wherein the modulation coils of the modulation device are arranged in the form of a one-dimensional array.

8. The sensor element according to claim 1, wherein the arrangement of the modulation coils extends over the entire width of the data carrier to be tested.

9. The sensor element according to claim 1, wherein the resonator device has a plurality of stripline resonators, with the number of stripline resonators in the resonator device being equal to the number of modulation coils in the modulation device, or that the number of stripline resonators in the resonator device is an integer multiple of the number of modulation coils in the modulation device.

10. The sensor element according to claim 1, wherein the stripline resonators of the resonator device have the same resonance frequency, with the stripline resonators of the resonator device designed and configured for operation in the same spatial mode, and that the stripline resonators of the resonator device have the same geometric shape.

11. The sensor element according to claim 1, wherein the stripline resonators of the resonator device are arranged in the same plane, advantageously on a common resonator carrier.

12. The sensor element according to claim 11, wherein said plane is perpendicular to the direction of the static magnetic flux.

13. The sensor element according to claim 1, wherein the polarization device generates substantially the same static magnetic flux at the location of each of the stripline resonators.

14. The sensor element according to claim 1, wherein the polarization device generates a spatially inhomogeneous static magnetic flux in the air gap.

15. The sensor element according to claim 1, wherein the modulated magnetic field has substantially only one single modulation frequency in the measuring range of each stripline resonator.

16. The sensor element according to claim 1, wherein the air gap has a height of less than 10 mm.

17. A test device for testing a flat-surface data carrier having a spin resonance feature, having a sensor element according to claim 1, and exactly one signal source from which all stripline resonators of the resonator device are fed.

18. The test device according to claim 17, having a transport device which inserts the flat-surface data carriers to be tested along a transport path into the air gap of the magnetic core or passes them through the air gap of the magnetic core, wherein the modulation coils of the modulation device are arranged in the form of a one-dimensional array which extends transversely to the direction of the transport path.

19. A method for testing a flat-surface data carrier having a spin resonance feature, by means of a sensor element or by means of a test device according to claim 17, wherein in the method a flat-surface data carrier to be tested is inserted into the air gap of the magnetic core of the aforementioned sensor element, the polarization device is used to generate a static magnetic flux in the air gap and the modulation device is used to generate a time-varying magnetic modulation field in the air gap, so that the modulated magnetic field generated by the modulation device together with the polarization device has different modulation frequencies at different locations within the air gap, and the resonator device is used to excite the spin resonance feature of the data carrier to be tested.

* * * * *